United States Patent
Zayeratabat

(10) Patent No.: US 6,523,302 B2
(45) Date of Patent: Feb. 25, 2003

(54) ONE PIECE GARDEN STAKE

(76) Inventor: Esmail Zayeratabat, 2495 Kingfield Way, San Jose, CA (US) 95124

( * ) Notice: Subject to any disclaimer, the term of this patent is extended or adjusted under 35 U.S.C. 154(b) by 0 days.

(21) Appl. No.: 09/730,033

(22) Filed: Dec. 4, 2000

(65) Prior Publication Data

US 2002/0066226 A1 Jun. 6, 2002

(51) Int. Cl.$^7$ .......................... A01G 9/12; A01G 17/04
(52) U.S. Cl. ........................ 47/44; 47/41.1; 47/41.14; 47/47; 248/530
(58) Field of Search ................ 47/41.1, 41.14, 47/42, 44, 47, 48.5; 248/530; 52/155; D8/1; 348/218.4; 173/128, 132

(56) References Cited

U.S. PATENT DOCUMENTS

| | | | | |
|---|---|---|---|---|
| 807,488 A | * | 12/1905 | McDaniel | 52/155 |
| 1,582,454 A | * | 4/1926 | Evans | 52/155 |
| 1,640,504 A | * | 8/1927 | Isaacs | 52/155 |
| 3,010,256 A | | 11/1961 | Ise | 47/42 |
| 3,579,908 A | * | 5/1971 | Morgan | 47/45 |
| 3,797,260 A | * | 3/1974 | Webb | 405/172 |
| 3,815,640 A | * | 6/1974 | Iida et al. | 138/146 |
| 4,231,246 A | * | 11/1980 | Gorenc et al. | 72/412 |
| 4,480,403 A | | 11/1984 | Williams | 47/42 |
| 4,745,706 A | | 5/1988 | Muza et al. | 47/47 |
| 4,790,533 A | * | 12/1988 | Potthast, Sr. | 173/90 |
| 4,870,781 A | * | 10/1989 | Jones | 47/43 |
| 5,483,782 A | * | 1/1996 | Hall | 52/730.1 |
| 6,202,367 B1 | * | 3/2001 | Marino et al. | 52/102 |

FOREIGN PATENT DOCUMENTS

GB 2218886 * 11/1989 ............. 47/47

* cited by examiner

Primary Examiner—Charles T. Jordan
Assistant Examiner—Tara M Golba
(74) Attorney, Agent, or Firm—Henry M. Stanley

(57) ABSTRACT

A unitary garden stake is provided from a formable length of tubing wherein an anvil is formed on an upper end of the tubular body and a wedge is formed on a lower end thereof. The anvil is formed by a plurality of longitudinal crimps along the length of the upper end. The wedge is formed by compressing the lower end of the unitary stake while removing a segment of the tubing wall near the lower end. The anvil is sufficiently strong to absorb the impact of blows administered to drive the wedge into underlying soil. A protective coating is applied to the stake when necessary.

3 Claims, 1 Drawing Sheet

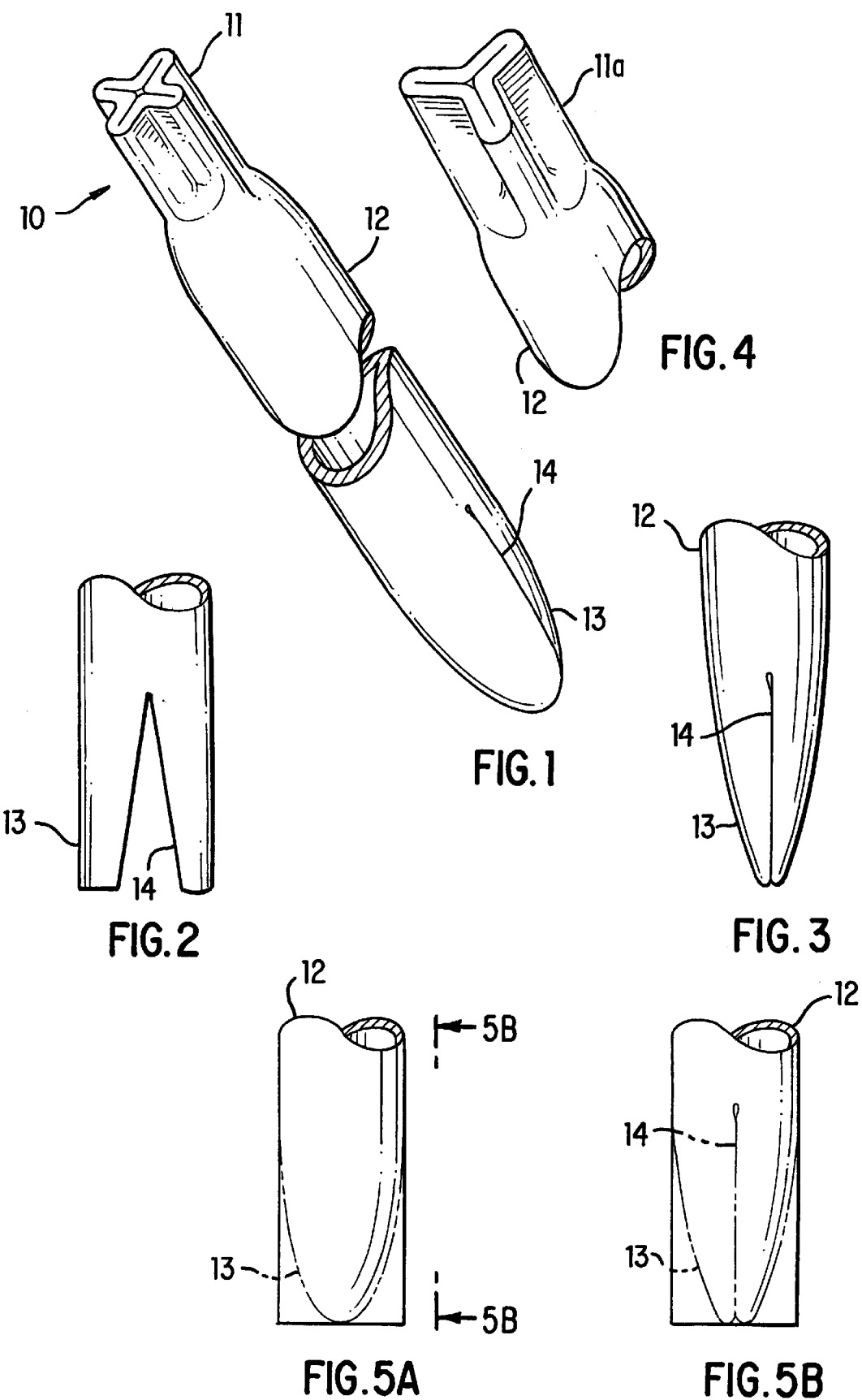

ONE PIECE GARDEN STAKE

SUMMARY OF THE INVENTION

The invention disclosed herein relates to a unitary stake that may be driven into soil to provide for plant support. The unitary stake has a tube body having a formable wall, wherein the tube has an upper end and a lower end together with an inner wall surface and an outer wall surface. At least three inwardly extending wall portions are formed at the upper end of the tube body, so that the inner wall surface on each of the at least three wall portions are substantially abutted to an adjacent inwardly extending wall portion. The lower end of the tube body has a segment of the formable wall removed from opposing sides of the tube body. The outer wall surfaces at the lower end are formed inwardly until the inner wall surface abuts an opposing inner wall surface, so that the lower end is wedge-shaped.

In another aspect of the invention, a stake is disclosed for use in a garden. A tubular member has a wall an upper end and a lower end. The stake has a compressed upper end on the tubular member so that the wall on the upper end is substantially adjacent an opposing wall thereon. The lower end has a segmented opening formed in the wall on opposing sides of the lower end. A compressed lower end is formed on the tubular member so that the wall on the lower end fills the segmented opening on opposing sides of the wall and forms a lower end wedge.

In yet another aspect of the invention, a unitary stake is provided for driving into a ground surface for gardening purposes. A tubular member has a formable wall, an upper end and a lower end. An anvil is formed from the formable wall at the upper end. A wedge is formed from the formable wall at the lower end.

In the method of the present invention, a unitary stake is formed from a single length of formable tubing having a tube wall. The method includes the step of compressing an upper end of the unitary stake so that the tube wall on one side thereof substantially abuts the tube wall on an opposing side. Also included is the step of removing a segment from opposing sides of the tube wall at a lower end on the single length of formable tubing, so that opposing openings are formed thereon. Finally, the step of compressing the formable tubing at the lower end thereof is included so that the opposing openings are closed and a wedge is formed thereon.

BRIEF DESCRIPTION OF THE DRAWINGS

FIG. 1 is a perspective (foreshortened) of the garden stake of the present invention.

FIG. 2 is an elevation of one end of the garden stake during the process of forming.

FIG. 3 is an elevation of the lower end of the formed garden stake.

FIG. 4 is a partial view of another embodiment of the upper end of the garden stake.

FIG. 5A is another elevation of the lower end of the garden stake of the present invention.

FIG. 5B is a view along the line 5B—5B of FIG. 5A.

DESCRIPTION OF THE PREFERRED EMBODIMENTS

One embodiment of the garden stake 10 of the present invention is shown in foreshortened view in FIG. 1 of the drawings. The stake is fabricated from a single piece of tubing having a tubular body with a wall thickness as shown. The stakes of the present invention are made in various lengths, for example, three feet, five feet, six feet, etc. These stakes have been made from ½-inch diameter, ¾-inch diameter and 1-inch diameter steel pipe stock. Some stakes have been fabricated from plastic pipe stock, 1-inch in diameter and having a ⅛-inch thick wall. The stock utilized for the stake of the present invention must be formable either by mechanical means or by heat means. The steel pipe is therefore of a malleable steel having an approximately ⅛-inch thick tube wall. An anvil 11 is formed at an upper end on a tubular body 12. The anvil 11 is formed by crimping the upper end of the tubular body at 90° arc spacings around the circumference of the tubular body. A cross section of the anvil 11 of FIG. 1 is a cross having four arms of equal length. A lower end on the tubular body 12 has a wedge 13 formed thereon. The wedge 13 is formed by initially removing a segment from opposing sides of the lower end of the tubular body, thereby forming the opening 14 as seen in FIG. 2 of the drawings. The lower end is clamped and compressed together to close the opening 14 and to form the wedge shaped lower end 13 as seen in FIG. 3. It should be noted that during the forming of the wedge 13 it has been found advantageous, although not absolutely necessary, to round the lower end to afford greater facility for the wedge at the lower end of the tubular body to enter the soil.

FIG. 4 shows an alternative embodiment of the anvil seen as item 11a. The anvil 11a is formed by crimping the upper end of the tubular body 12 at three points separated by 120° of arc. While simply collapsing the walls of the tubular body so the opposing inner surfaces of the inner wall abut would create an anvil, it is preferred that at least three crimps be made in the upper portion of the tubular body to form the anvil at the upper end thereof. This affords sufficient strength in the anvil to withstand the necessary hammer blows required to insert the stake of the present invention into the ground. The hammer blows are applied at the free end of the anvil 11 and 11a, whereupon the impact delivered by the hammer blows causes the wedge 13 at the lower end of the tubular body to enter the soil to a sufficient depth to stabilize the stake of the present invention in an upright and plant supporting position.

In the description of the method for fabrication of the unitary stake of the present invention, it should be noted that the stake is formed from a single length of formable tubing. It is appropriate to use a die for forming the anvil 11 of FIG. 1 or the anvil 11a of FIG. 4. The upper end of the tubular body is compressed so that the tube wall on one side of the tubular body substantially abuts the tube wall on an opposing side, as shown in the Figures. A segment of the tube wall is removed from opposing sides of the tubular body at the lower end thereof. The resulting opposing openings formed by removal of the segment from each side of the tube wall are closed by compressing the formable tubing to form a wedge at the lower end. The operations of removing segments and compressing the formable tubing at the lower end may also be performed simultaneously through the use of a die. In such an instance the die is configured to compress the lower end and to remove corners and round the free end of the wedge as seen in the orthogonal views of FIGS. 5A and 5B. In these Figures the material outside of the phantom lines is removed. The process also includes coating the formed unitary stake with a powder coating, a plastic coating, or an appropriate paint coating. The embodiments of FIGS. 1, 3 and 4 have such a coating applied when the unitary stake is in a finished condition.

Although the best mode contemplated for carrying out the present invention has been shown and described herein, it will be understood that modification and variation may be made without departing from what is regarded to be the subject matter of the invention.

What is claimed:

1. A unitary stake for driving into soil for providing plant support, comprising a single piece tube body having a formable wall, said tube body having an upper end and a lower end, an inner wall surface and an outer wall surface, at least three inwardly extending wall portions formed at said upper end, said inner wall surface on each of said at least three wall portions being abutted to an adjacent inwardly extending wall portion and appearing as radially symmetrical at said upper end, said lower end having a segment of said formable wall removed from opposing sides thereof, wherein a pair of depending members are formed at said lower end, and round ends on said pair of depending members, wherein said round ends are formed inwardly until said inner wall surface abuts an opposing inner wall surface, wherein said lower end has a rounded wedge shape.

2. A stake for use in a garden, wherein a single piece tubular member has a wall, an upper end and a lower end, comprising a compressed upper end on the single piece tubular member having at least three inwardly extending wall portions so that the wall on the upper end is radially symmetrical and abuts an opposing wall thereon at said at least three wall portions, the lower end having a segmented opening formed in the wall on opposing sides thereof to form a pair of opposing depending members, rounded lower ends on said pair of opposing depending members, and a compressed lower end on said tubular member, wherein the wall on the lower end fills said segmented opening on opposing sides and forms a rounded lower end wedge.

3. A method of forming a unitary stake from a single length of formable tubing having a tube wall, comprising the steps of compressing an upper end of the formable tubing so that the tube wall on one side thereof abuts the tube wall on an opposing side in at least three positions to obtain a radially symmetrical appearance, removing a segment from opposing sides of the tube wall at a lower end thereof to form opposing depending members separated by opposing openings, rounding the lower-ends of said opposing depending members, and compressing the formable tubing at said lower end, wherein the opposing openings are closed and a rounded lower end wedge is formed.

\* \* \* \* \*